United States Patent Office 3,416,452
Patented Dec. 17, 1968

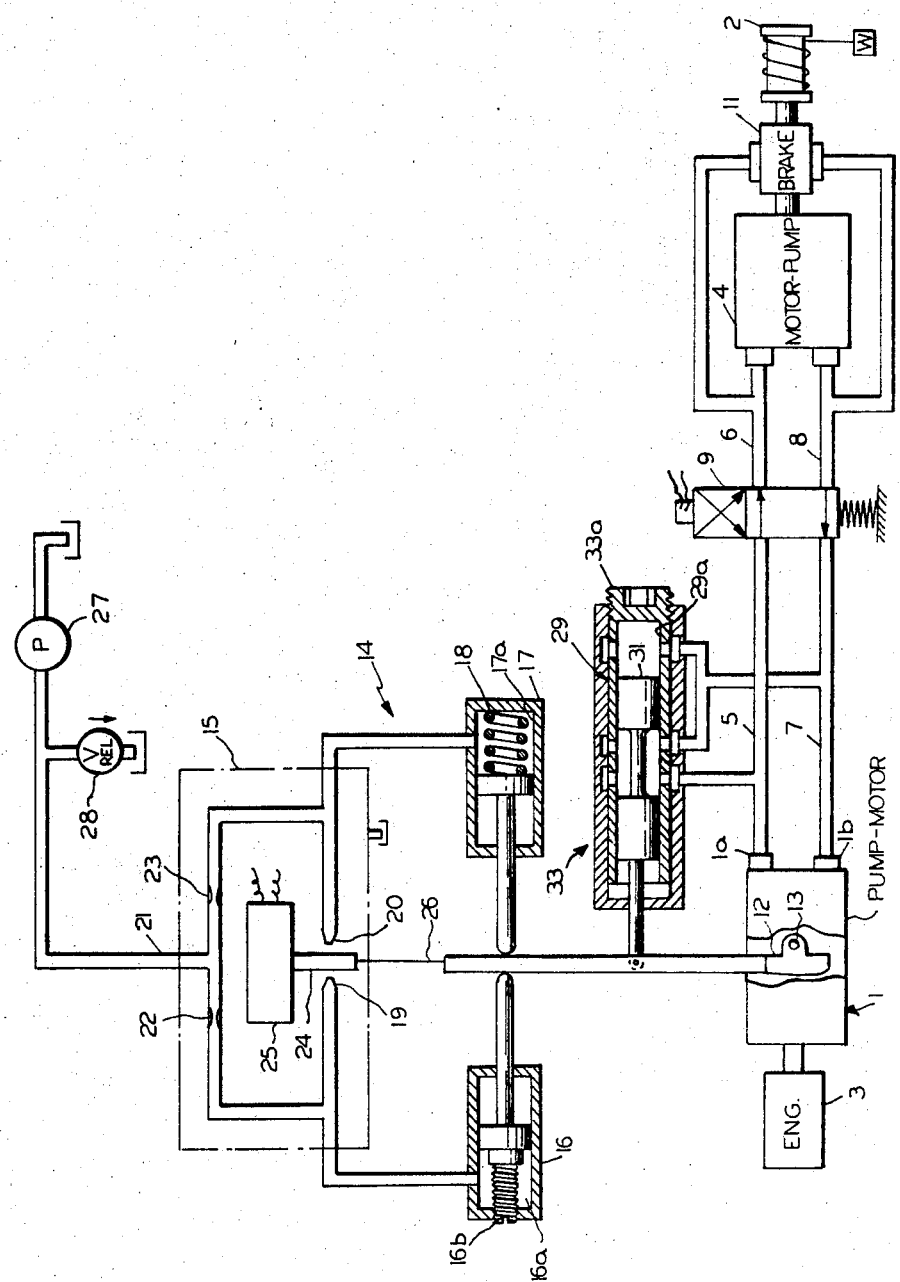

3,416,452
CONTROLS FOR VARIABLE DISPLACEMENT
PUMPS
Edward V. Misulis, Watertown, N.Y., assignor to General
Signal Corporation, a corporation of New York
Filed Dec. 29, 1966, Ser. No. 606,094
2 Claims. (Cl. 103—10)

ABSTRACT OF THE DISCLOSURE

A variable displacement, hydraulic pump-motor unit having a displacement control element which is biased toward zero and maximum displacement positions, respectively, when the unit is pumping and motoring. A power operated mechanism normally positions the displacement control element, but allows that element to move in accordance with the bias acting on it when its supply of motive power is interrupted. A safety device, in the form of a fluid pressure motor connected with the inlet port of the unit, automatically shifts the displacement control element to zero displacement position when the supply of motive power to the power operated mechanism is interrupted while the unit is motoring.

---

This invention relates to variable displacement, hydraulic pump-motor units, and is particularly concerned with those units of this type whose displacement is varied by a power-operated mechanism.

A pump-motor unit of this kind is in common use today in hydrostatic transmissions wherein it is driven by a prime mover and is connected in a closed hydraulic circuit with a fixed displacement motor-pump unit. The pump-motor unit frequently employs a rotary cylinder barrel, which carries a circular series of longitudinally reciprocating pistons, and an inclined cam plate which moves the pistons on their discharge strokes and serves to vary the displacement of the unit. As is known in the art, the hydraulic reaction forces transmitted between the pistons and the cam plate urge the latter toward the zero displacement position when the unit is acting as a pump and toward the maximum displacement position when the unit is acting as a motor. The position of the cam plate commonly is controlled by a hydraulically powered servomechanism which is so designed that, when its source of motive fluid fails, it permits the cam plate to move under the action of the normal bias which acts on it. Thus, if the unit is acting as a pump, and is driving the other unit of the transmission as a motor, at a time when the supply of motive fluid to the controls is interrupted, the cam plate will move to the zero displacement position to thereby prevent further movement of the driven load. However, if, at the instant of failure, the unit is being driven as a motor, the cam plate will move to the maximum displacement position and allow the load to continue in motion. This condition can be particularly serious when the unit is incorporated in a transmission used to drive a hoisting winch.

The object of this invention is to provide an improved servo-controlled pump-motor unit of the general type discussed above which will fail safe when the supply of motive power for the controls is interrupted, regardless of whether it is serving as a pump or as a motor. According to the invention, the hydraulic unit is provided with a fluid pressure shifting motor, which responds to the pressure at the inlet port of the pump-motor unit, and which is designed to shift the displacement control element to the zero displacement position against the opposition of the normal biasing force. During pumping operation, the inlet port is at low pressure, and the shifting motor has no effect upon the position of the displacement control element. Therefore, if the supply of motive fluid to the servo control is interrupted, the normal biasing force will move the displacement control element to zero displacement position. On the other hand, during motoring operation, the inlet port of the unit is at high pressure, and consequently the shifting motor will continuously urge the displacement control element toward the zero displacement position. Thus, if the supply of control fluid should fail under this condition, the shifting motor will immediately move the displacement control element to the zero displacement position and bring the transmission to rest.

The preferred embodiment of the invention is described herein with reference to the accompanying drawing whose single figure is a schematic diagram of the improved pump-motor unit and a typical hydrostatic transmission in which it is used.

As shown in the drawing, the improved pump-motor unit 1 is incorporated in a hydrostatic transmission which is arranged to drive a hoisting winch 2. Unit 1, which is of the rotary cylinder barrel, longitudinally reciprocating piston type, is driven by an engine 3 and is connected in a closed transmission circuit with a similar, but fixed displacement, motor-pump unit 4 by four conduits 5–8, the conduits 5 and 7 being connected, respectively, with the discharge and inlet ports 1a and 1b of unit 1. The direction of flow through the motor-pump unit 4 is controlled by a solenoid operated reversing valve 9, and the system is so designed that unit 4 causes winch 2 to reel in cable when valve 9 is in the illustrated position. The drive connection between motor-pump unit 4 and winch 2 is equipped with a pressure responsive brake 11 which serves to lock the winch, and prevent dropping of load W, whenever conduits 6 and 8 both are at low pressure.

The displacement of pump-motor unit 1 is controlled by a cam plate 12 which is angularly adjustable about the axis of trunnion 13 between the illustrated zero displacement position and a maximum displacement position. The hydraulic thrust forces transmitted between cam plate 12 and the pistons (not shown) of unit 1 bias the cam plate toward the zero and the maximum displacement positions, respectively, when the unit is pumping and motoring. Under normal operating conditions, cam plate 12 is positioned by a servomechanism 14 which includes a conventional electrohydraulic servo valve 15, a pair of opposed control motors 16 and 17, having equal effective areas, and a light compression spring 18 which is provided to counteract frictional forces and the moment on cam plate 12 produced by the forces required to accelerate the pistons of unit 1. Servo valve 15 comprises a pair of nozzles 19 and 20, which are connected with the supply passage 21 through a pair of inlet orifices 22 and 23, respectively, and which are controlled by a flapper 24. The position of the flapper relative to the nozzles is determined by the joint action of a torque motor 25 and a deflectable feedback wire 26. The working chambers 16a and 17a of the two control motors 16 and 17 communicate with the nozzle circuits of the servo valve at points intermediate the nozzle 19 or 20 and the associated orifice 22 or 23, so that as the flapper 24 moves in opposite directions from its null position, the pressures in these working chambers are varied in reverse senses. Motive fluid for the servomechanism is supplied by a fixed displacement control pump 27 which is driven by a prime mover (not shown) and whose discharge pressure is limited by a relief valve 28.

The fail safe device provided by the present invention consists of a fluid pressure shifting motor 29, including a piston 31 which is connected with cam plate 12, and a working chamber 29a which is in constant communication with the inlet port 1b of unit 1. Motor 29 is so sized that the force it develops is adequate to overcome the bias acting on cam plate 12 and shift the cam plate to the zero displacement position when unit 1 is motoring and servomechanism 14 is inoperative. In the illustrated embodiment, the piston 31 of the shifting motor also serves as the sliding spool of an unloading valve 33, which interconnects the inlet and discharge ports 1b and 1a, respectively, of unit 1 whenever cam plate 12 is in a narrow range of movement adjacent the zero displacement position. This valve 33, which is the subject of the co-pending application of Donald Schneckenburger, Ser. No. 606,105 filed Dec. 29, 1966, gives the pump-motor unit 1 a deadband at low operating pressures which is comparable to that of servomechanism 14, and thus insures that this unit will not drive unit 4 and winch 2 when the servomechanism is idle.

Before the transmission is put in service, the limit stop 16b associated with control motor 16 is adjusted to position cam plate 12 in its zero displacement position, and the ported sleeve 33a of unloading valve 33 is positioned to cause this valve to interconnect the ports 1a and 1b of unit 1 at that position of cam plate 12 which affords to unit 1 the desired deadband. Servo valve 15 also is adjusted to insure that, with zero input signal, flapper 24 is centered between nozzles 19 and 20.

When the transmission is in operation, and torque motor 25 is de-energized, the pressures in working chambers 16a and 17a will be substantially equal, and control motors 16 and 17 will hold cam plate 12 in or close to its zero displacement position. If, because of the deadband of servomechanism 14, cam plate 12 is not exactly in the zero displacement position, pump-motor unit 1 will discharge some oil through port 1a. However, since unloading valve 33 is now open, and consequently discharge port 1a is in free communication with inlet port 1b, the pressure in closed transmission circuit 5–8 will be low. Therefore, motor 4 will not develop any driving torque, and brake 11 will be applied.

In order to raise load W, the operator shifts reversing valve 9 to its illustrated position, if it is not already in that position, and applies to torque motor 25 an electrical signal of a polarity which causes this motor to move flapper 24 toward nozzle 19. This movement of the flapper raises the pressure in working chamber 16a relative to the pressure in working chamber 17a, so the control motors 16 and 17 now move cam plate 12 in the clockwise direction about the axis of trunnion 13. This increases the displacement of unit 1. Since unloading valve 33 closes shortly after cam plate 12 commences to move, the pressure in conduits 5 and 6 now rises, brake 11 releases, and motor-pump unit 4 commences to drive winch 2 in the reel in direction. As cam plate 12 moves away from the zero displacement position, feed-back wire 26 exerts an increasing torque on flapper 24 which urges it toward the null position against the opposition of the torque developed by motor 25. When the cam plate reaches the displacement position corresponding to the magnitude of the electrical input signal, the restoring torque will have returned flapper 24 to its null position. Therefore, at this time, the pressures in working chamber 16a and 17a again equalize, and cam plate 12 comes to rest.

The speed at which load W is raised depends directly upon the displacement of unit 1 and can be changed by varying the magnitude of the signal supplied to torque motor 25. When the magnitude of this signal is reduced, the torque exerted by flexed wire 26 shifts flapper 24 toward nozzle 20 and causes the pressure in working chamber 17a to rise above the pressure in working chamber 16a. The control motors now move cam plate 12 in the counterclockwise direction to a reduced displacement position. When the torques exerted by feedback wire 26 and motor 25 are again balanced, flapper 24 will be in its null position, and cam plate 12 will come to rest. If the operator de-energizes torque motor 25, cam plate 12 will move back to, or close to, the zero displacement position. As the cam plate passes through the small displacement position in which unloading valve 33 opens, the pressure in the transmision circuit will be dissipated, unit 4 will cease to develop driving torque, and brake 11 will be reapplied.

In order to lower load W, the operator shifts valve 9 to the position in which it connects conduits 5 and 7 with conduits 8 and 6, respectively, and again applies to the servo valve 15 a signal whose magnitude corresponds to the desired speed of descent of the load. If load W is light, winch 2 may have to be driven in the pay out direction. In this case, unit 1 will act as a pump and drive unit 4 as a motor, and conduits 5 and 8 will define the high pressure side of the circuit. On the other hand, if load W is heavy, it will drive unit 4 as a pump, and this unit, in turn, will drive unit 1 as a motor. In this case, conduits 6 and 7 define the high pressure side of the circuit. In either case, brake 11 will be released as soon as cam plate 12 moves to the position in which unloading valve 33 closes, and the load W will be lowered at a speed which is proportional to the displacement of unit 1. When the operator de-energizes torque motor 25, cam plate 12 will be returned to its neutral position, valve 33 will open, and brake 11 will be applied to bring the load to rest.

The illustrated hoisting system is designed to fail safe during either the reel in or the pay out operation, regardless of whether the failure is in the electrical or the hydraulic portion of the servomechanism. When a failure occurs in the electrical circuit during either operation, torque motor 25 is rendered incapable of balancing the restoring torque imposed on flapper 24 by flexed wire 26, and, therefore, the flapper will immediately move toward nozzle 20. This raises the pressure in working chamber 17a relatively to the pressure in chamber 16a and causes the motors 16 and 17 to return cam plate 12 to its zero displacement position. On the other hand, when there is a failure in the hydraulic circuit, such as a break in the supply line leading from pump 27, the control motors 16 and 17 are rendered incapable of either maintaining cam plate 12 in its current position or of moving it to the zero displacement position. If, at the time of the failure, unit 1 is acting as a pump, the bias acting on cam plate 12 will be urging it toward zero displacement position, and consequently this bias will immediately move the cam plate to that position. If, on the other hand, the unit 1 is motoring when the failure occurs, the bias will be acting in the opposite direction, and the cam plate tends to move to maximum displacement position. However, since, under this condition, conduit 7 is at high pressure, the force developed by shifting motor 29 now will be large enough to overcome the bias and shift cam plate 12 to the zero displacement position. From this discussion it should be evident that, while the method of arresting movement of load W upon occurrence of a failure varies with mode of operation and type of failure, cam plate 12 always will return to zero displacement position, and load W will be brought to rest, whenever the operator is deprived of the means of properly controlling it.

Although the illustrated embodiment employs an unloading valve 33 which prevents the transmission from hydraulically locking motor-pump unit 4, it will be realized that movement of cam plate 12 to the zero displacement position still has the effect of stopping unit 4 because it always is accompanied by dissipation of the pressure in the high pressure side of the circuit, and by application of brake 11. Of course, in embodiments which do not use the unloading valve 33, movement of cam plate 12 to zero displacement position will itself prevent further movement of the load W.

What is claimed:
1. In combination
    (a) a variable displacement hydraulic pump-motor unit of the type including inlet and discharge ports, and a displacement control element which is biased toward a zero displacement position when the unit is driven as a pump and toward a maximum displacement position when the unit is driven as a motor;
(b) control means adapted to utilize motive power to position the displacement control element and to permit that element to move in accordance with the bias acting on it when the supply of motive power is interrupted; and
(c) safety means which is automatically effective to move the displacement control element toward the zero displacement position when the supply of motive power to the control means is interrupted while the unit is being driven as a motor, said safety means comprising
  (1) a fluid pressure shifting motor having a working chamber and a movable member which is subject to the pressure in that chamber and is arranged to shift the displacement control element toward the zero displacement position, and
  (2) a passage connection the working chamber with the inlet port of the unit.
2. The combination defined in claim 1 which includes
(a) an unloading valve having a movable element which is connected with the displacement control element and which interconnects the inlet and discharge ports of the unit whenever the displacement control element is between the zero displacement position and a predetermined position in which the displacement of the unit is materially less than maximum displacement; and
(b) wherein the movable member of the fluid pressure motor is defined by the movable element of the unloading valve.

References Cited
UNITED STATES PATENTS

| | | | |
|---|---|---|---|
| 1,947,540 | 2/1934 | Wallace | 103—38 |
| 2,571,758 | 10/1951 | Purcell | 103—38 |
| 3,020,890 | 2/1962 | Grad | 103—38 |
| 3,180,090 | 4/1965 | Hawley et al. | 103—162 |
| 3,186,310 | 6/1965 | Neff et al. | 103—162 |
| 3,270,508 | 6/1966 | Smith et al. | 103—162 |
| 3,286,990 | 11/1966 | Weisenbach | 60—531 |

WILLIAM L. FREEH, *Primary Examiner.*

U.S. Cl. X.R.

103—038, 162, 047